(12) United States Patent
Niazi

(10) Patent No.: US 8,463,632 B2
(45) Date of Patent: Jun. 11, 2013

(54) MANAGEMENT AND AUTOMATIC INVOCATION OF SCHEDULED COLLABORATION EVENTS

(75) Inventor: Uzair Niazi, San Ramon, CA (US)

(73) Assignee: Oracle International Corporation, Redwood Shores, CA (US)

( * ) Notice: Subject to any disclaimer, the term of this patent is extended or adjusted under 35 U.S.C. 154(b) by 675 days.

(21) Appl. No.: 12/269,225

(22) Filed: Nov. 12, 2008

(65) Prior Publication Data

US 2010/0121666 A1  May 13, 2010

(51) Int. Cl.
*G06Q 40/00* (2012.01)
(52) U.S. Cl.
USPC .................................. 705/7.11; 705/7.42
(58) Field of Classification Search
USPC ............................... 705/7.11, 7.42
See application file for complete search history.

(56) References Cited

U.S. PATENT DOCUMENTS

| | | | |
|---|---|---|---|
| 5,491,797 | A | 2/1996 | Thompson et al. |
| 5,544,237 | A | 8/1996 | Bales et al. |
| 5,559,876 | A * | 9/1996 | Alperovich ............. 379/205.01 |
| 6,754,323 | B1 * | 6/2004 | Chang et al. ............. 379/205.01 |
| 6,760,423 | B1 * | 7/2004 | Todd ......................... 379/202.01 |
| 6,798,753 | B1 * | 9/2004 | Doganata et al. ............. 370/260 |
| 7,660,849 | B1 * | 2/2010 | Shaffer et al. ............... 709/204 |
| 2005/0202806 | A1 | 9/2005 | Bourgeois et al. |
| 2005/0286699 | A1 * | 12/2005 | Gagle ........................ 379/202.01 |
| 2006/0101098 | A1 * | 5/2006 | Morgan et al. ................. 707/204 |
| 2006/0167941 | A1 * | 7/2006 | Huang et al. ................ 707/104.1 |
| 2007/0049261 | A1 * | 3/2007 | Joglekar ....................... 455/416 |
| 2007/0081651 | A1 | 4/2007 | Iyer et al. |
| 2008/0201436 | A1 * | 8/2008 | Gartner ......................... 709/206 |

FOREIGN PATENT DOCUMENTS

WO    WO 2008/036128 A1    3/2008

OTHER PUBLICATIONS

Singh, Aameek et al.; "Design and Implementation of SIP Network and Client Services"; http://sysnet.ucsd.edu/~pmahadevan/publications/SIP231.pdf, 6 pages.
Slutsman, L.; "A proposal for new PINT building blocks with applications to Conference Calling <draft-ietf-print-conf-01.pdf>"; http://tools.ietf.org/pdf/draft-ietf-print-conf-01.pdf, 2000, 7 pages.
"Automatic Conference"; http://www.sipcenter.com/sip.nsf/html/Automatic+Conference, 2 pages.

* cited by examiner

*Primary Examiner* — Thomas Dixon
*Assistant Examiner* — Benjamin S Fields
(74) *Attorney, Agent, or Firm* — Kilpatrick Townsend & Stockton LLP

(57) ABSTRACT

A collaboration event framework can be used to schedule and automatically invoke a collaboration event. An event coordinator may schedule a collaboration event, and the framework will automatically initiate contact with event participants using participant contact preferences. Participants can be asked to enter an identifier to verify the participant's identity. An event coordinator may be presented with a display that indicates the status of participants of the collaboration event. A system administrator may review all scheduled collaboration events to determine resource shortages.

16 Claims, 7 Drawing Sheets

Collaboration Resource Dashboard

Date: Jan 1, 2009

| Time: | Phone Bridge Ports | Web Conf. Bandwidth | Video Conf. Bandwidth |
|---|---|---|---|
| 8:00 AM | 0 | 0 | 0 |
| 9:00 AM | 25 | 1.5 Mbps | 0 |
| 10:00 AM | 35 | 10 Mbps | 100 Mbps |
| 11:00 AM | 20 | 5 Mbps | 50 Mbps |
| 12:00 PM | 10 | 0 | 0 |
| 1:00 PM | 35 | 10 Mbps | 100 Mbps |
| 2:00 PM | 50 | 20 Mbps | 200 Mbps |
| 3:00 PM | 35 | 10 Mbps | 100 Mbps |
| 4:00 PM | 15 | 15 Mbps | 25 Mbps |
| 5:00 PM | 0 | 0 | 0 |

FIG. 7

Collaboration Resource Dashboard

Date: Jan 1, 2009
Time: 2:00 – 3:00 PM

| | Phone Bridge Ports | Web Conf. Bandwidth | Video Conf. Bandwidth |
|---|---|---|---|
| Event 1 | 15 | 10 Mbps | 100 Mbps |
| Event 2 | 25 | 10 Mbps | 100 Mbps |
| Event 3 | 10 | 0 Mbps | 0 Mbps |

FIG. 8

MANAGEMENT AND AUTOMATIC INVOCATION OF SCHEDULED COLLABORATION EVENTS

BACKGROUND

The present disclosure relates generally to scheduling and initiating collaboration events. In particular, one embodiment relates to a framework for scheduling resources and automatically invoking a collaboration event using preferences provided by the collaboration event participants.

The use of collaboration tools (teleconference, web-conference, instant chat, video conference etc) is essential to enable effective and efficient communications amongst employees, vendors, customers, suppliers, and any other participants that need to communicate in order to get the business of the organization done. Well organized meetings that use these collaboration techniques, that are started on time with all required and essential participants, should produce better results than meetings that are not organized effectively, and/or initiated on time, and/or don't have all the relevant/important participants available. For an organization in which collaboration meetings are started late, the cost in terms of loss of employee productivity and employee costs can amount to significant sums of money when accumulated over a period of time.

When scheduling an event, the person organizing the meeting can use email to determine participants' availability for the meeting. An email can be sent to all participants suggesting a time for the meeting (or polling participants for the most suitable time for that meeting) and participants are required to confirm if that timeslot would work for them. The participants would respond indicating whether they can attend or not and/or will offer alternative timeslots. This iterative cycle continues until a timeslot can be found where all participants can be scheduled for that meeting.

With the advent of calendaring applications, the scheduling of meetings has become easier and more efficient, as the availability of the required participants for a particular time during the week can be looked up in a shared calendaring application at the time the meeting is being created. There is no time lost in arranging the meeting as is the case described above in which email is used to coordinate participant availability and eventual meeting time. Moreover, calendaring applications, based on participants availability, can automatically find/search the first available time slot that all participants are available, making it easier to schedule a meeting.

Once a meeting slot has been identified at which all participants can participate, then the meeting can be created in the calendaring application and all participants can be informed of the meeting details. That is, the meeting appointment will appear in the participants calendar view for that day.

Although calendaring applications have made it easier to schedule collaboration events and notify participants of the events, many problems still exist when the time for the meeting actually arrives. For example, a meeting that is to be held via a telephone conference facility (i.e. participants dial-in using their telephone, mobile phone or IP Phone) may have a phone number and passcode for that meeting provided to the attendees of that meeting via the calendar invite. Likewise if the meeting is to be via a video conference then details of the video conference session ID and passcode are provided for participants in the calendar invite. Also if the meeting is a through the use of a web conference then a web conference id and passcode is provided in the calendar invite. However, such a scheme assumes that the collaboration event participants will have access to their calendaring application in order to retrieve the various call in numbers and conference passcodes. With the increasing mobility of today's workforce, collaboration participants may be attending meetings from any number of locations where they lack access to their calendaring applications. Furthermore, the manual process by which collaboration even participants join a collaboration event is prone to user error which not only increases the amount of time wasted in joining a collaboration event, but also increases the user's frustration level if multiple attempts at joining the event are required.

A further problem occurs when a subset of participants have joined the collaboration event. It is unclear at the start of the event who else will be joining the collaboration session and typically all participants will wait a few minutes, allowing "grace time" for all participants to join the event before a critical mass is present to make it worthwhile to commence the event. The need for participants to look up calendar invites, look up call details, and dial into meetings or invoke URLs to launch collaboration sessions, and then wait for some arbitrary time for all participants to join before starting the event all lead to inefficiencies, loss of productivity and directly to an opportunity cost (i.e. the economic cost of not being able to do something more effective with their time while waiting for participants to join the collaboration session). Though the loss of productivity may be a few minutes or more for the event as a whole, when multiplied by the number of participants in the event and then multiplied again by the many tens, hundreds or thousands of events that take place within an organization in a year, the costs can be quite significant.

Another problem present with calendaring solutions as they exist today is even when details of a collaboration session are entered for a meeting in the calendaring system, the collaboration resources required at the time of the meeting are not known. That is, current calendaring systems do not indicate what network resources, for example, are required for the organization at a given time during the day. If, for example, several hundred users of a conference call facility all dial into a collaboration event simultaneously and the system does not have sufficient bandwidth (lines) to make all those connections, then participants are waiting on busy signals and need to dial in again for their connection to be made. Likewise if many web-conferences are scheduled to take place at the same time a similar situation can occur. It would be useful for network and systems administrators to know in advance what the demands will be on the network so that they can ensure that the collaboration systems demands on the network can be met (or prioritized).

Embodiments of the present invention attempt to solve these and other problems individually and collectively.

BRIEF SUMMARY

Systems and methods in accordance with various embodiments provide for a collaboration event scheduling framework. Such a framework allows a collaboration event coordinator to schedule collaboration events using one or more collaboration resources, such as telephone conferencing, web conferencing, or video conferencing. The framework can be integrated with existing participant calendaring applications, such that the collaboration event coordinator can determine the availability of participants of the event. At the time of the collaboration event, the framework can initiate contact with the various participants of the event, using event access preferences that have been specified by the participant. Participants may be required to enter a personal identifier to verify the identity of the participant joining the collaboration event.

Advantageously, the participant will only require a single identifier to verify his identity, as opposed to a separate identifier for each collaboration event.

Furthermore, a framework as described herein can allow a collaboration event system administrator to review all scheduled collaboration events to determine resource requirements for all scheduled collaboration events. The collaboration event scheduling framework may be integrated with other systems within an organization, such that the framework has access to the information necessary to schedule and initiate collaboration events.

In one embodiment, a method of using a collaboration services framework to automatically schedule and invoke a collaboration event is disclosed. The collaboration services framework may receive a request from a collaboration event coordinator for a collaboration event. The request may include a date and time for the collaboration event, a list of participants of the collaboration event, and at least one access resource type to be used for the collaboration event. The information contained in the request for the collaboration event may be stored in a scheduled collaboration events database. Each participant's access resource type preferences for joining a collaboration event may be determined. At the scheduled date and time of the collaboration event, contact with each participant may be attempted by using each participant's access resource type preferences. The collaboration services framework may grant access to a collaboration event in response to receiving an identifier from each participant that verifies the participant's identity. The identifier can be associated with the participant, and not the scheduled collaboration event.

A collaboration services platform may further provide a system administrator an interface to the scheduled collaboration events database which allows the system administrator to view access resource type requirements for all scheduled collaboration events. The resource requirements can be analyzed to determine sufficient resources are available for all collaboration events, and if insufficient resources are available, the events can be prioritized. Prioritization can be based on event participants, subject matter of the event, or an expected return on investment of the event. If insufficient resources are available, the collaboration event coordinator can be notified such that the event can be rescheduled or modified to use different access resources. In the alternative, the system administrator may attempt to add additional access resources.

A collaboration services platform can additionally provide the event coordinator with an interface to display which collaboration event participants have joined the event. The interface can further provide the event coordinator with information regarding which participants are currently in the process of joining the event or have failed to join the event. Participants to the event can be joined using access resource preferences that they have previously defined. The access resources preferences can be defined in an order, such that the collaboration platform can attempt to join participants using access resources that are most preferred by the participant, and using less preferred access resources when the participant can not be contacted. If a participant can not be contacted via one of the access resource preferences, but is currently logged into the organizations computer network, the participant may be sent an instant message informing him of the scheduled event.

In addition to other methods that can be used in accordance with these and other embodiments, there also are a number of systems, computer products, and other such aspects for implementing, practicing, performing, or otherwise utilizing aspects of the various embodiments.

A further understanding of the nature and the advantages of the inventions disclosed herein may be realized by reference of the remaining portions of the specification and the attached drawings.

BRIEF DESCRIPTION OF THE DRAWINGS

Various embodiments in accordance with the present invention will be described with reference to the drawings, in which:

FIG. 7 depicts an exemplary collaboration resource dashboard;

FIG. 8 depicts a targeted view of a collaboration resource dashboard;

DETAILED DESCRIPTION

Figure 1:
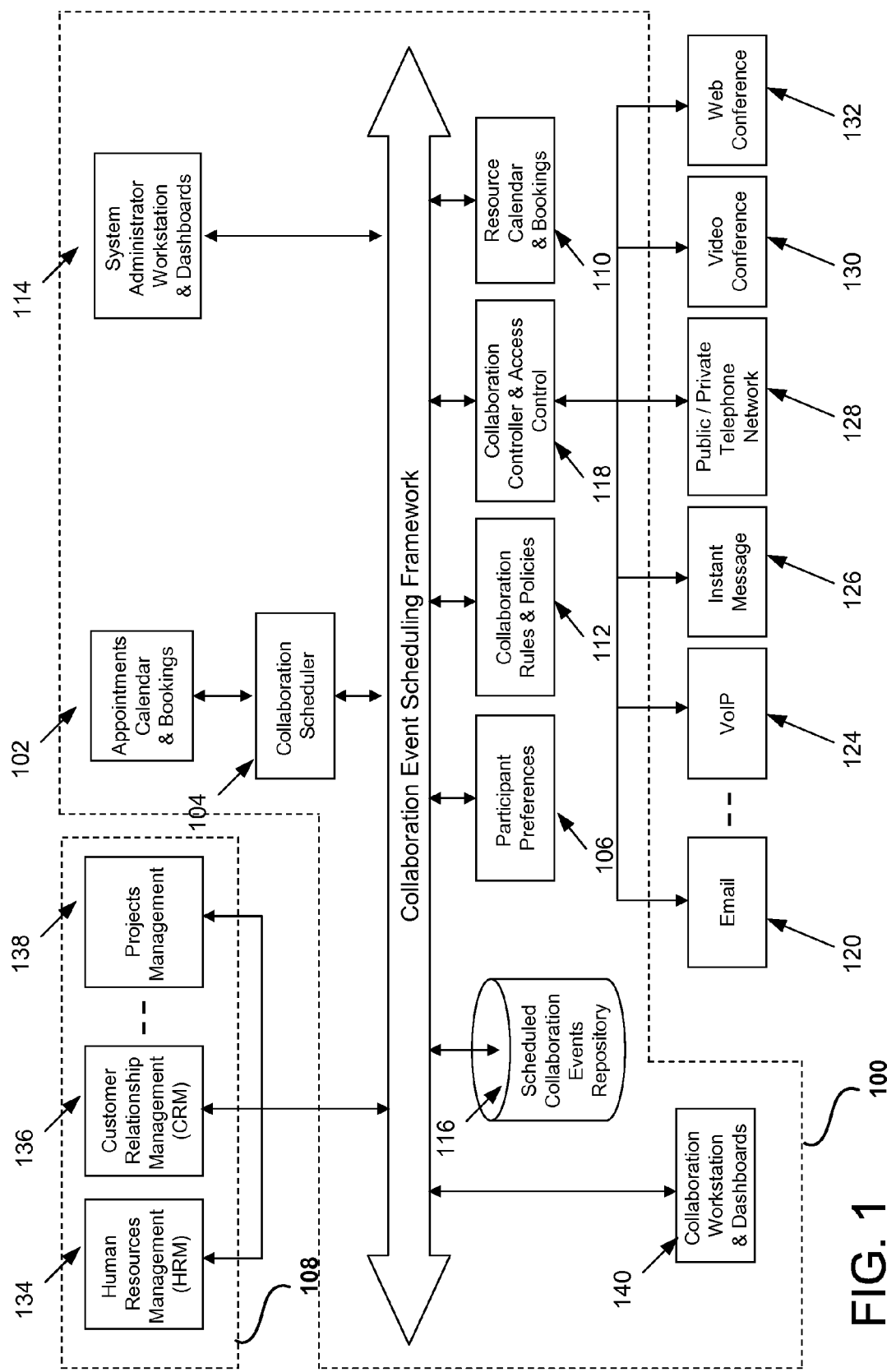
FIG. 1 depicts an exemplary embodiment of a collaboration event scheduling framework.

Systems and methods in accordance with various embodiments can take advantage of a framework or other such component for scheduling and invoking collaboration events to alleviate the problems mentioned above is presented. A framework useful for scheduling and invoking collaboration events may be integrated with or embedded within a calendaring system. Such a framework can also leverage information from other organization systems, such as employee directories maintained in human resources systems. When a collaboration event is set up via the calendaring application, an event coordinator should not have to enter event specific details regarding the collaboration event. For example, in the case of a telephone conference, the event coordinator will not need to specify conference call phone in numbers or passcodes. For a web conference, the event coordinator will not need to specify log in urls, event identifiers, or passcodes.

The organizer should simply be allowed to specify what collaboration resources would be required for the meeting. For example, if a meeting is to be set up between a manager and his direct reports across multiple geographic locations, the manager can simply identify the participants to be invited and also identify which collaboration resources will be required for the meeting. The manager can select the collaboration technique to be teleconference only, or web-conference and teleconference, or video-conference etc. Whichever technique is most suitable for the event can be chosen. Once all the participants (according to their availability) and collaboration resources are identified, the meeting can then be created/saved in the calendaring application. The conference call facility number or web-conference number and pass-code or meeting id are not entered by the organizer of the event.

The framework itself, at the time that the event is scheduled to start, can be configured to automatically call any or all of the participants to join the collaboration event. For example, in the case of a teleconference, a teleconference meeting space is created by the framework using a conference call facility. The framework then simultaneously calls all the participants automatically to join the event. The participants do not initiate the call. This means that the participants do not need to check their calendars for the meeting invite nor do they need to look up the conference call dial-in and login details which could result in delays in joining the meeting. With the embedded framework, the framework does all the work of automatically dialing in the participants at the correct time. Similarly, if a web-conference collaboration resource is identified for that meeting the embedded framework can invoke the web-conference session and launch the web-conference on the computers that the participants are logged into on the network.

For security purposes, the participants can be requested to enter a passcode to join the collaboration session. The passcode is not a passcode created by the event organizer (as this would require looking up the pass-code in the calendar invite) but is a passcode that is unique to the participant and is registered with the embedded framework. Once the participants enter their own passcodes, the embedded framework will check if each participant is on the list of attendees for the meeting and permit or reject access to the appropriate collaboration event.

Unlike prior methods/solutions an advantage of various approaches outlined in this disclosure is that meeting participants are not required to check their calendars for meetings, or remember conference call numbers or remember passcodes other than their own unique passcode. The calendaring application with the embedded framework will "call" (via the appropriate collaboration resource) the participants that have been scheduled to be at that event at the right time. Furthermore the participant is not required to enter a meeting ID and meeting passcode at all.

The embedded framework in this embodiment knows what access resources to use to join participants to a collaboration event. The participants may keep their access resource information up-to date for collaboration purposes. This information may be retrieved from an HR system or any other such system that is accessible to the embedded framework. Furthermore the contact preferences for the participants can also be stored. For example, if the attendee can be contacted by office phone and mobile phone and prefers to be contacted in that order, when the collaboration event is initiated, the framework can call the participant on the office phone first and if and only if there is no response, the framework can call the participant on his mobile phone. The sequence/priority order can be based on user preferences that are maintained by the user or can be specified by business policy.

When a web-conference collaboration event has been scheduled, a framework can be configured to first determine whether all participants are able to collaborate via a web-conference. For example, the event coordinator must be available online. The framework will track the organizers' "presence" on the network. At the time of the scheduled collaboration session the organizer and all participants are alerted of the meeting via a dialog box. The dialog box could inform the participant that a collaboration event he is scheduled to attend has started. The participant could be further prompted to enter his identification code to verify his identity.

An alert to join the event can be delivered to the computer on the network that that the participant is currently logged into. The user may then accept the invitation to join and is immediately connected into the collaboration session. Likewise for a video conference, a similar alert can be sent to the computer that the attendee is logged in from In all cases, the participant is not required to look up any collaboration details (i.e. conference call numbers or URL pointing to a web-conference or video conference session). Nor is the participant required to enter in a meeting id or pass-code. This allows collaboration events to be much more effective and will permit events to be invoked much more efficiently than by each attendee manually invoking and joining the event. This saves time, ensures meetings are started on time, and consequently increases the probability of a more productive and effective meeting/collaboration event.

The framework in this example can also provide the coordinator of the event a dashboard that shows which participants have joined the meeting and through which collaboration method (i.e. teleconference, or web-conference or video conference etc). The dashboard can also show who is still being contacted by the framework (i.e. pending participants). For example if the framework calls a participant by phone to join an event, but his line is busy, the dashboard can present that information/status to the coordinator. The framework can identify the status of how many times a participant has been called unsuccessfully and on which numbers (office, mobile, home etc.). If a key participant for a particular meeting is not reachable as indicated by the status on the dashboard, the meeting coordinator can cancel the meeting, rather than having many participants waste time waiting for the key participant. The dashboard indicates which of the participants are connected to the collaboration session through which of the permitted collaboration mechanisms—telephone, cell phone, video conference, web-conference etc. The organizer does not need to do a roll-call of who is currently joined to the collaboration event. The information regarding currently joined participants is available to the meeting coordinator via the collaboration status dashboard.

Based on the information on the dashboard, the coordinator can decide when to start the event. If the dashboard shows that a key attendee is still in the process of being contacted then that information is known to the organizer. An additional advantage of the framework is that it can keep track of which participants actually joined the event. Again that information is presented to the organizer through the dashboard. If a participant was unable to attend a collaboration event, an alert can be sent to the participant indicating that they were invited to join an event, but the framework was not successful in connecting the attendee at that given time using the contact information and preferences that were provided by the participant.

In the case of a phone call, when an attempt to contact a participant fails and that participant's voicemail is reached, the embedded framework can leave a message using a text to speech mechanism indicating the event that the participant needs to join. If the call is answered by the participant he may be informed that the event has begun and can be prompted for his personal identifier to verify the participant's identity.

An additional benefit of such a framework is that as events, participants, and resources are being scheduled in advance through the calendaring system associated with the framework, the framework can provide useful information to system administrators. Demands that will be placed on the corporate infrastructure (telephone lines, network bandwidth etc.) at a particular time through-out the day can be identified. This information can be made available on an administrator's dashboard. This information is extremely useful for systems and network planning purposes as it permits administrators to bring more resources to bear during peak times or alternatively permits administrators to predict when performance degradation might occur if additional resources are not able to be put in place.

FIG. 1 depicts an exemplary embodiment of a collaboration event scheduling framework. Framework 100 may include an appointment calendaring and booking system 102 which may be used to schedule collaboration events. A collaboration event coordinator may use calendaring system 102 to determine the availability of participants of a collaboration event in order to schedule the event. In some embodiments, framework 100 may access external calendaring 102 applications. In other embodiments, calendaring 102 applications may be integrated within framework 100.

Once availability of participants of a collaboration event has been determined, an event coordinator may use a collaboration event scheduler 104 to schedule the event. In some embodiments, event scheduler 104 can be used to determine the type(s) of access resources that will be used for the collaboration event. For example, the event coordinator may specify that the collaboration event will be a telephone conference and a web conference. Any number of other access resources are contemplated within framework 100.

Once a collaboration event has been scheduled by an event coordinator, details of the preferences of participants of the event can be retrieved from a participant's preferences system 106. Participant preferences 106 can include contact information for each potential access resource that may be used for a collaboration event. For example, for a phone conference, the phone number for a participant can be specified. In some embodiments, the contact preferences may be modified by the participant to reflect that participant's preferences. In other embodiments, the preferences may be retrieved from external systems 108 maintained by the organization. The contact preferences 106 can be used by the framework 100 at the scheduled time of the collaboration event to contact the participants.

In addition to determining the participants' contact preferences, framework 100 may also store resource requirements for the collaboration event in a resource calendaring and booking system 110. Resource calendaring system 110 may be used to reserve resources, such as video conference facilities, required for the collaboration event. In some embodiments, resource calendaring systems 110 will be integrated with calendaring systems 102. In other embodiments, resource calendaring system 110 may be a stand alone system. Collaboration event scheduler 104 may also access resource calendaring systems 110 when scheduling collaboration events to determine if required resources for an event have already been reserved by other events. In such cases, event coordinators may be able to determine other times for the event when the required resources are available.

Once an event coordinator, using calendaring system 102 to identify participants of the event, participant preferences 106 to identify participants' contact preferences, and resource calendaring systems 110 to identify and reserve resources for the event, has scheduled an event, the scheduled collaboration event may be stored in a scheduled collaboration events repository 116 by the collaboration events framework 100. Scheduled collaboration events repository 116 may be used to store all scheduled events. When the time for a particular event has arrived, framework 100 may retrieve the details from the collaboration events repository 116 to initiate the event.

In some embodiments, framework 100 may also include a collaboration rules and policies system 112. A collaboration rules and policies system 112 can include rules specified by the organization regarding collaboration events. Such rules can include how events are prioritized, conditions necessary for events to proceed, and any other rules defined by the organization. Collaboration event rules and policies system 112 may be used by the framework 100 when scheduling collaboration events. Collaboration event rules and policies system 112 may also be used by system administrator systems 114 when resolving conflicts between multiple collaboration events. For example, if insufficient resources are available for all scheduled collaboration events, collaboration rules and policies systems 112 can be used to determine which events should be rescheduled or canceled.

In some embodiments, system administrator systems 114 may also be used to review access resources required for all scheduled collaboration events. As described above, systems administrator systems 114 may access scheduled collaboration events repository 116 to determine all scheduled collaboration events. System administrators may then make decisions based on collaboration rules and policies systems 112 and external systems 108 regarding scheduled collaboration events. In some cases where insufficient resources are available for collaboration events, system administrators may add additional resources. In other cases, system administrators may determine that certain collaboration events must be canceled or rescheduled because insufficient resources are available. System administrator systems 114 may access human resource systems 134, customer relationship management systems 136, projects management systems 138 in addition to collaboration rules and policies systems 112 in order to determine which events should be canceled or rescheduled.

Human resource systems 134 may provide information regarding the participants of a particular collaboration event in order to prioritize events based on the organizational position of participants of the event. Customer relationship management systems 136 may provide information regarding the relative importance of customers who may be the subject of the collaboration event. Projects management systems 138 may provide information regarding the relative importance of projects that may be the subject of the collaboration event. Using this information, in conjunction with collaboration rules and policies systems 112, system administrators may be able to more accurately prioritize collaboration events.

In some embodiments, when the scheduled time for a collaboration event has arrived, framework 100 may initiate the event through a collaboration controller and access control system 118. Collaboration controller 118 may be connected to any number of access resource systems. For example, Collaboration controller 118 may be connected to e-mail systems 120, Voice over Internet Protocol systems 124, instant message systems 126, public private telephone networks 128, video conference systems 130, and web conference systems 132. Depending on the type of event that is being initiated, framework 100 through collaboration controller 118 may utilize the access resources to contact event participants. In some embodiments, collaboration controller 118 will use preferences stored in participant preference systems 106 to determine the appropriate access resource to use for each participant.

In addition to initiating contact with each participant, collaboration controller 118 may also verify the identity of each participant as they join the collaboration event. In some embodiments, controller 118 will prompt each participant to enter an identifier to verify the participant's identity. In some embodiments, this identifier is specified by the participant and stored in participant preference systems 106, while in other embodiments the identifier may be stored in external systems 108. Use of such an identifier allows the collaboration controller 118 to verify that only authorized participants are joining the event while at the same time not requiring participants to maintain any information regarding any specific event.

In some embodiments, framework 100 may also include collaboration workstation and dashboard systems 140. Using dashboard systems 140, an event coordinator may be able to review the current status of all participants joining a collaboration event. Dashboard systems 140 may allow the event coordinator to view which participants have joined the collaboration event, which participants are in the process of being joined, and which participants have failed to join the event. Event coordinators may use dashboard systems 140 to make decisions regarding the event, such as if the event should proceed, or if the event should be canceled.

Although embodiments as described in reference to FIG. 1 refer to various different elements and systems, such representation is not intended to be limiting. It is contemplated that embodiments may use any number of computing apparatus. In some embodiments, all systems as described in FIG. 1 may be implemented on a single computer system, while in other embodiments, each system may be a stand alone system. Some exemplary computing apparatus suitable for implementation of the various embodiments described within this disclosure are described in FIG. 9 and FIG. 10. Additional apparatus and arrangements would be well known to a person of skill in the art.

Figure 2:
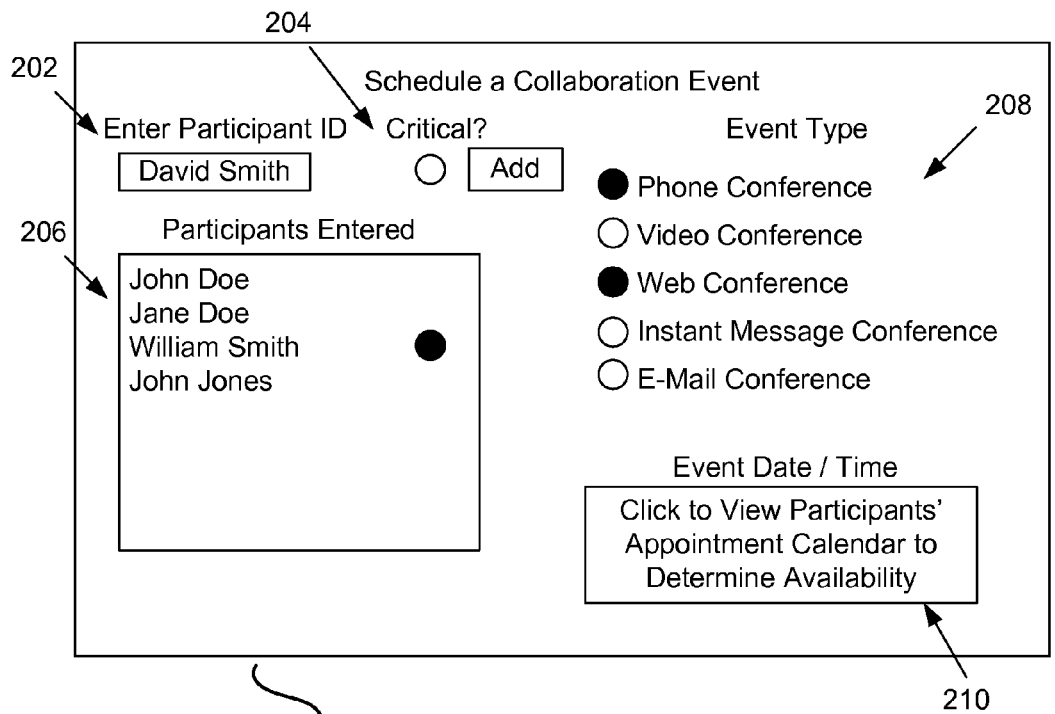
FIG. 2 depicts an exemplary screen shot of a page to schedule a collaboration event.

FIG. 2 depicts an exemplary screen shot of a page to schedule a collaboration event according to one embodiment of the invention. An event coordinator may use a schedule collaboration event page 200 to schedule a collaboration event. The event coordinator may begin by entering user identifiers 202 of participants that should be invited to the collaboration event. Each participant may be designated as a critical participant 204. In some embodiments, when the time for the collaboration event has arrived, if all participants who have been designated as critical do not join the collaboration event, the event coordinator may decide to cancel the event. Once the complete list of participants 206 that should be invited to the meeting has been entered, the collaboration event coordinator may choose the type of the collaboration event.

The collaboration event coordinator may be presented with a list of event types 208 for the collaboration event. As shown in FIG. 2, some exemplary event types may be a phone conference, a video conference, a web conference, an instant message conference, and an e-mail conference. The list of event types is merely exemplary and is in no way intended to be exhaustive. Any type of resource that can be used for a collaboration event, either currently existing or yet to be developed, would be able to make use of the framework for the automatic invocation of collaboration events.

It should be noted that in the exemplary screen shot of FIG. 2, the collaboration event is chosen to be both a Phone and a Web conference. There may be many reasons for this, such as some participants not having access to a computer for a web conference. Collaboration events may be scheduled using more than one type of resource based on preferences of the participants, availability of resources, the type of content to be presented during the event, or any number of other criteria. A single collaboration event may allow for connection to the event through any number of access methods. Once the participants and critical participants for the collaboration event have been identified, and the type of collaboration event has been specified, the event coordinator may then schedule the collaboration event.

Scheduling the collaboration event may make use of many currently available calendaring applications. One such calendaring application is part of the Collaboration Suite of products produced by the assignee of the present application. A calendaring application may allow an event coordinator to view the availability of all the required participants of an event, in order to schedule the event at a time when all participants, or at least the critical participants, are available. FIG. 2 depicts an exemplary interface 210 to the calendaring system, wherein the event coordinator can click on a button 210 when the meeting participants have been identified in order to view their availability. However, this is only one exemplary embodiment. In other embodiments, the collaboration event scheduler may be integrated into the calendaring program itself.

Figure 3:
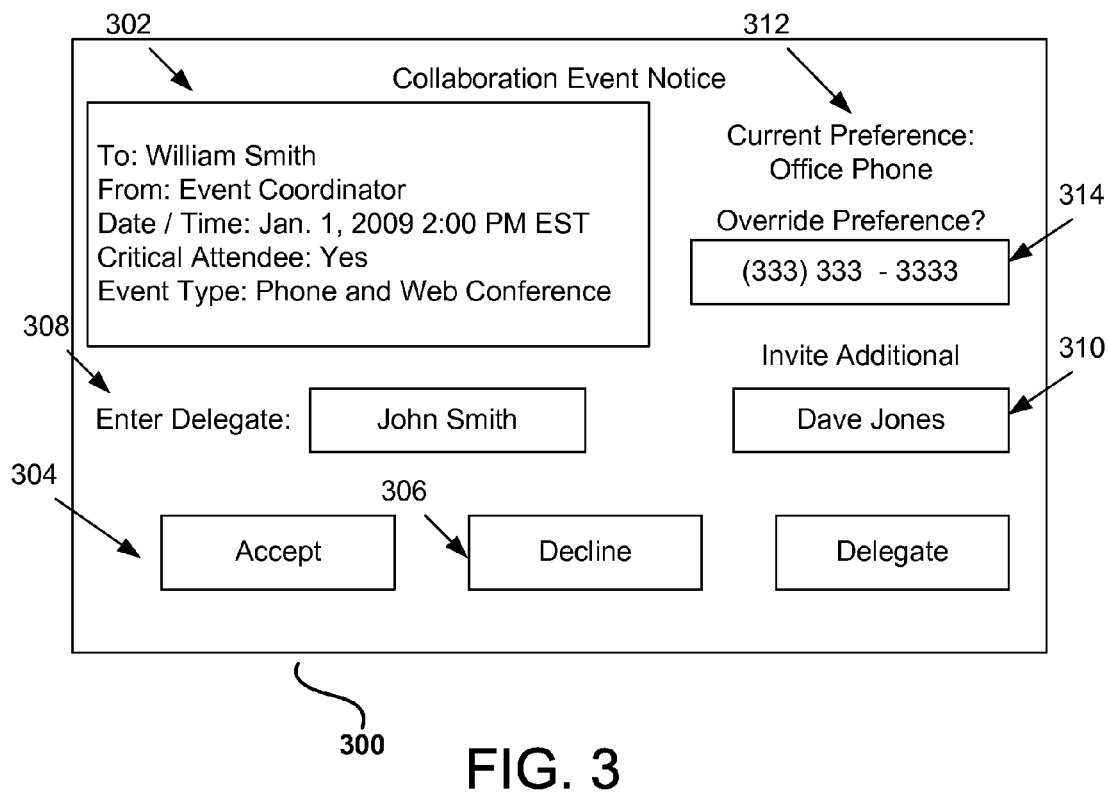
FIG. 3 depicts an exemplary collaboration event meeting notice.

FIG. 3 depicts an exemplary collaboration event meeting notice that may be sent to a collaboration event participant. Event Notice 300 may include details for the collaboration event directed to each individual participant. For example, meeting details 302 may notify the participant of the date and time of the collaboration event. The details 302 may further specify the type of collaboration event. As depicted in this example, the collaboration event is of type Phone and Web Conference. The event details 302 may further notify the participant if they are considered a critical attendee of the event.

In some embodiments the meeting participant may be given the opportunity to accept 304 or decline 306 the invitation to the collaboration event. In alternate embodiments, and depending on the collaboration event rules and policies, an event participant may be required to attend the event and as such, the option to decline 306 may not be available. For example, the collaboration events rules and policies may be set to mandate that any participant who is designated as a critical attendee must attend, or the event may not proceed. Collaboration event rules and policies may be flexible depending on the particular organizations needs.

In some embodiments, an invitee to a collaboration event may not be able to attend the event himself. In such a case, the invitee may wish to delegate his invitation to the event to another, for example to a subordinate employee. Embodiments of the present invention may allow a collaboration event invitee to designate a delegate 308 to attend. In some embodiments, designating a delegate may trigger a notification to the event coordinator, who must then approve or deny the request to have the delegate attend the collaboration event. If the coordinator determines a delegate is acceptable, a new event notification may be sent to the delegate. In other embodiments, approval from the event coordinator may not be required, such that a collaboration event invitee may delegate attendance at will.

As depicted in FIG. 3, the event notification may also allow for the event invitee to invite additional 310 participants to the event. As in the case where attendance is delegated, in some embodiments, requests for additional invitees must first be approved by the event coordinator, and upon approval, new event notifications will be sent to the additional participants. In other embodiments, an event invitee may invite additional attendees at will. As explained above, collaboration event rules and policies may be devised to meet the needs of the organization.

In addition to allowing a collaboration event invitee to select a delegate or additional participants, the collaboration event notice may also allow the invitee to override 314 his currently selected preferences 312 for joining the collaboration event. As has been explained above and will be more fully explained with respect to FIG. 5, collaboration event participants may select preferences for how to be joined to collaboration events. These preferences may be used by the system to determine the best way to contact the participant. For example, a participant may prefer to be contacted on his office phone for telephone conferences. If he is unavailable on his office phone, he may set a preference to be contacted on his cell phone. A participant will only need to define these preferences once, and the framework can maintain these preferences.

Situations may arise where the participant knows he will not be available through his currently selected preferences. For example, the participant may know he will be working from home at the time of the collaboration event, such that he will not be able to answer his office phone. Furthermore, he may know that he does not receive cell phone service inside his house, so any attempt to contact him by cell phone will fail. In such a situation, the participant may desire that he be joined to the event via his home landline phone. One option would be to change his preferences to indicate his home phone as a preference. As an alternative, some embodiments may allow the participant to override 314 his established preferences for a specific event and for that event only. In the present case, the participant may specify his home phone is to be used to contact him for the event associated with this particular notification. Any other events the participant is scheduled to attend will use his normal established contact preferences.

Figure 4:
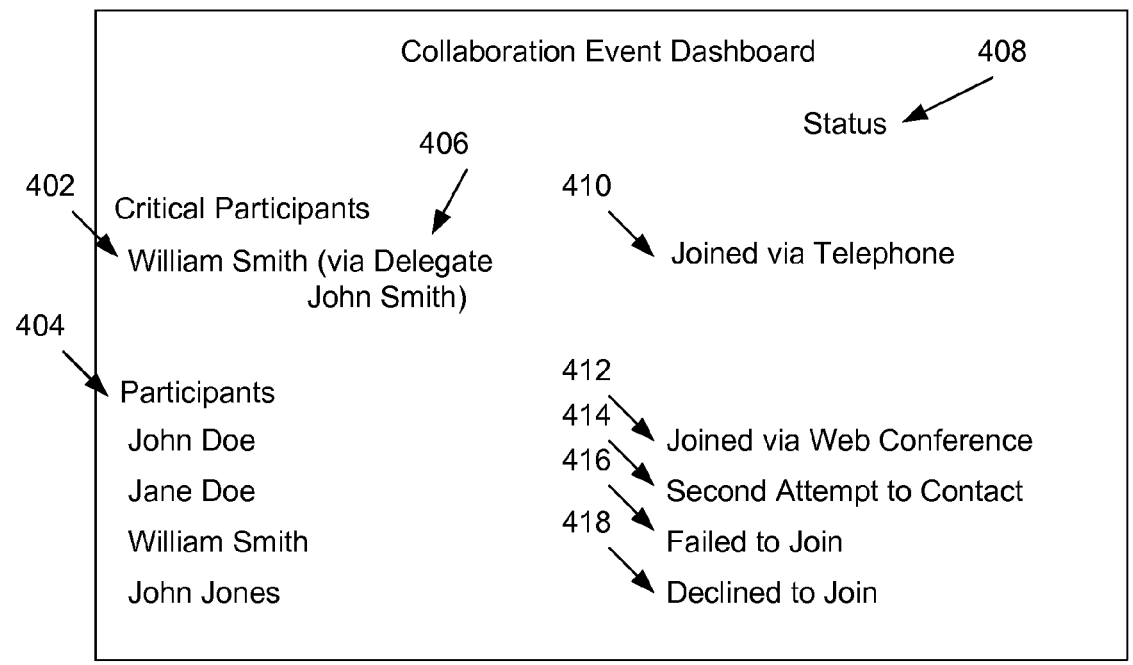
FIG. 4 depicts an exemplary collaboration event dashboard.

FIG. 4 is an exemplary collaboration event dashboard that may be presented to the collaboration event coordinator at the time of the collaboration event. Collaboration event dashboard 400 may present the event coordinator with information that is necessary to determine how to proceed with the event. For example, event dashboard 400 may display the critical 402 and non-critical 404 participants who have been invited to the event. In the example depicted in FIG. 4, there is one critical participant, who has designated that he will attend the event through a delegate 406. The example also displays to the event coordinator that there are four additional participants 404 who have been invited to the event.

In addition to the list of participants that have been invited to the collaboration event, the event dashboard 400 can also present the event coordinator with a current status 408 of each participant. The status can allow the event coordinator to determine which participants are already currently joined to the event, which participants are in the process of being joined, and which participants either could not be joined or declined to join the collaboration event. For example, FIG. 4 depicts critical participant William Smith, acting through delegate John Smith 406, is currently joined to the collaboration event via telephone 410. Likewise, participant John Doe is joined to the event via Web Conference 412.

Participant Jane Doe is currently not joined to the collaboration event, and the framework is currently making its second attempt 414 at joining Jane Doe. In some embodiments, the framework will attempt to contact each participant multiple times, through the use of the participant's defined preferences. Because the framework has indicated to the event coordinator that it is still attempting to contact Jane Doe, the event coordinator may delay the start of the event until Jane Doe's status is known.

At some point the framework may run out of options in attempting to contact a participant. For example, for a phone conference, a participant may indicate that he wishes to be contacted first on his office phone and if that fails, on his cell phone. However, if contacting the participant on his cell phone fails, in some embodiments, the framework will give up attempting to contact the participant. This is depicted in FIG. 4 where participant William Smith has failed to join 416 the event. In alternate embodiments, the framework may not give up, and continue to attempt to contact the participant via the participant's preferences. In some embodiments, if the framework is unable to contact the participant and is directed to a voicemail system, the framework may leave a message for the participant informing him that the time for a scheduled collaboration event has arrived, and his presence is being requested. The framework may leave instructions as to how the participant may join the event. In some embodiments, the framework may contact an unresponsive participant through the participant's current computer network presence, as will be explained further with respect to FIG. 6.

In some cases, and as described above, a participant such as John Jones may have responded to the event notification by declining to join the event 418. In this case, the framework may not make any attempts at joining participants who have declined, because such attempts may be futile.

Given the information presented on the event dashboard 400, the collaboration event coordinator may decide how to proceed with the event. If a critical participant, or someone representing the critical participant, has not yet joined, it may be necessary to delay the start of the event. In some cases, if a critical participant fails to join, the event coordinator may decide to cancel the event. Furthermore, the event dashboard 400 allows the event coordinator to see who is currently joined to an event that is in progress. This may result in increased event efficiency, as it will no longer be necessary for a roll call to be performed or time being wasted in trying to determine if a particular person has joined the event. In some embodiments, the information presented on the event dashboard 400 may be stored persistently in the collaboration event platform. If it is necessary to determine in the future who participated in an event in the past, this information would be readily available. Storing information regarding the participants actually joining the event is superior to merely reviewing participants' calendars. In the latter case, a participant may have been invited to an event, such that it appears on their calendar, but did not actually join.

Figure 5:
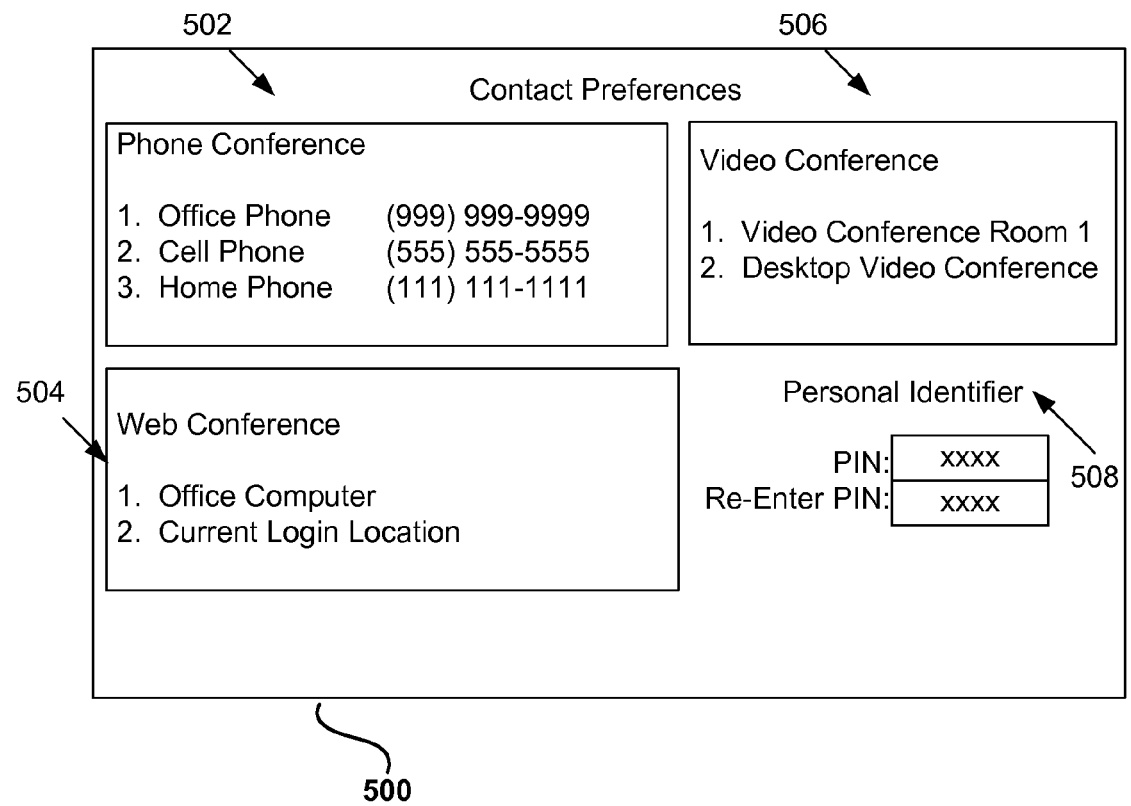
FIG. 5 depicts an exemplary contact preferences screen.

FIG. 5 depicts an exemplary contact preferences screen according to some embodiments. Contact preferences screen 500 can allow a participant to register his contact preferences with the collaboration event framework. In some embodiments, the participants contact preferences can be stored in a participant preferences database as has been described with respect to FIG. 1. A user will typically specify his preferences in advance of any collaboration events, such that the preferences are available to the framework when scheduling an event.

In some embodiments, a user may define his contact preferences for each type of collaboration event. For example, a user may specify his phone conference 502 preferences. In this exemplary embodiment, a user may be able to provide one or more phone numbers, in preference order, for contacting the user for phone conferences. In this example, the user has specified his preferences to indicate he wishes to be contacted on his office phone first. If that fails, his cell phone should be tried next. If that fails, his home phone should be tried. Although this exemplary embodiment has listed three different phone numbers to attempt to contact the user, this is not intended to be limiting. Any number of contact preferences may be specified.

Similarly to specifying phone conference preferences 502, a user may also specify preferences for any other collaboration event access resources that are available. In this exemplary embodiment, the user may also specify contact preferences for web conferences 504 and video conferences 506. As with the phone conference preferences, the framework may attempt to contact the participant based on his ordered preferences.

By allowing a user to specify his contact preferences, a collaboration event coordinator is relieved of the burden of determining how to contact a collaboration event participant. The coordinator can simply schedule an event, such as a phone conference, and the framework will automatically determine how the participant should be contacted.

Although not depicted in FIG. 5, a user may also specify an access resource preference for collaboration events using multiple access resources. For example, the collaboration event as described in FIG. 2 was defined to be both a phone conference and a web conference. A user may specify that he prefers phone access over web access, and that he should be contacted by phone first. The framework can then attempt to contact the user through his phone preferences. If that fails, the framework can attempt to contact the user through his web preferences. The user may specify an ordered list of access resource preferences, and the framework may attempt to contact the user by traversing that list, while also considering the access resources that have been allowed by the collaboration event coordinator.

In addition to specifying his access and access resource preferences, in some embodiments a user may also specify a Personal Identification Number (PIN) 508 that can be used to verify a participants identity. As has been explained previously, in prior systems verification of the identity of a participant was typically performed by requiring the participant to enter a meeting code and optionally a password. Possession of the meeting code and password was generally sufficient to indicate that this is an authorized participant. However, this presents participants with the burden of maintaining access to their calendaring application in order to retrieve the various codes. In other prior systems, where the system automatically contacts the participant, there is no verification that the person that actually answered the phone is actually the person who was invited to the collaboration event.

By allowing a user to specify a PIN, the framework can have a means of verifying that the person contacted to join a collaboration event is actually the person that was invited. For example, if the framework, using the participant's contact preferences, contacts a participant on his home phone, the participant can be requested to enter his PIN. This will ensure that it is the participant himself that actually answered the call, and not some other person who happens to be at the participant's home. Furthermore, the participant advantageously is not required to remember or have access to his calendaring application in order to retrieve meeting codes or passwords for a specific event. He is only required to remember his own PIN, which will be used for all events. Although in this exemplary embodiment, the user is allowed to specify his own PIN, in alternate embodiments, the user identifier may be an assigned PIN. In other embodiments, the user identifier may not be stored with the user's contact preferences, but may be stored in other systems, such as human resource or information technology systems. In some embodiments, the user identifier may be the same identifier that a user uses to log into the organizations computing systems.

Figure 6:
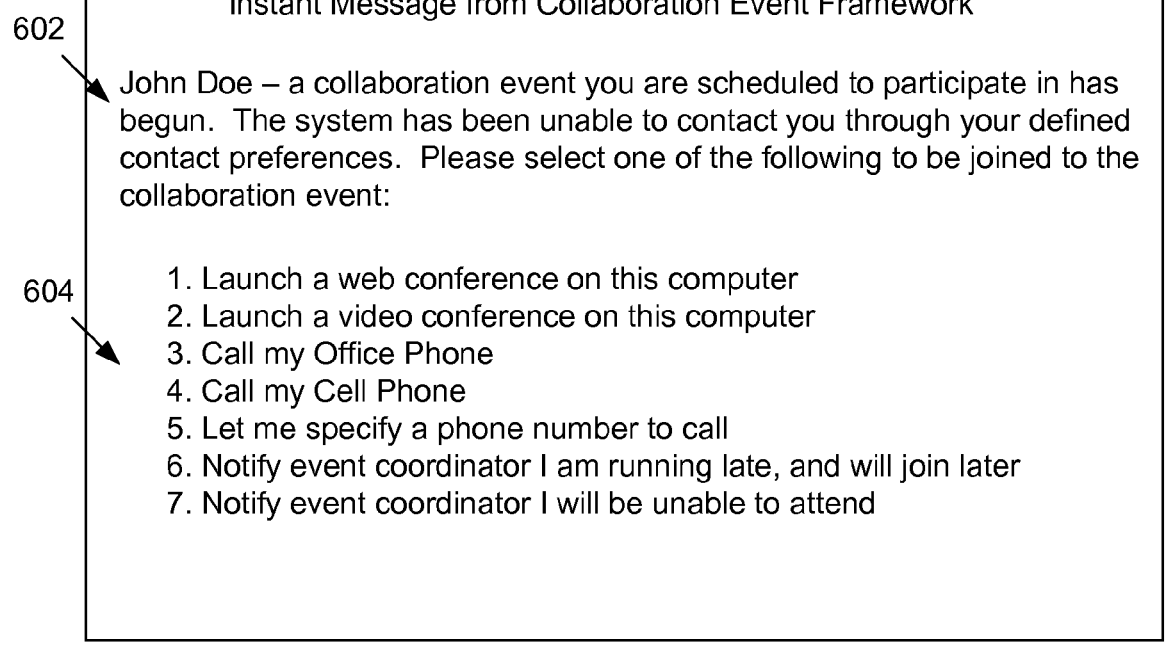
FIG. 6 depicts and exemplary instant message screen.

FIG. 6 depicts an exemplary instant messaging interface. The collaboration event framework may detect a user's presence on the network for instant messaging. A user's presence on the network can be detected wherever the user is currently logged into the network. This may be the user's office, a guest office within the organization, at home, or at any other location where a user may gain access to the network (e.g. a coffee shop). In some embodiments, the collaboration framework may send the user a reminder via an instant message, that a scheduled collaboration event is about to begin. This reminder may inform the user of his current preferences, and notify the user that the framework will attempt to contact him using those preferences. Furthermore, the collaboration framework may give the user the opportunity to override his current preferences.

For example, one hour prior to a phone conference, the framework may send an instant message to a participant informing him that a collaboration event is scheduled to start in one hour, and his preferences indicate he should be contacted at his office phone. The participant may not currently be in his office, but rather may be logged into the network from home, or perhaps from a guest office within the organization. The participant can then either choose to physically return to his office prior to the collaboration event or may provide new contact information for the collaboration event. An exemplary instant message interface will be described below.

In addition, in some embodiments the framework may use an instant messaging interface to contact a participant when they have failed to join a collaboration event using their preferred access method. For example, a user's preferences may specify that he should be contacted on his office phone. If at the time of the collaboration event, the framework is unable to contact the user on his office phone, but does detect that the participant is currently connected to the network, the framework may send an instant message to the participant. An example of such a message is depicted in FIG. 6.

FIG. 6 depicts and exemplary instant message screen. Instant message 600 is an example of an instant message that may be sent by the collaboration framework to an event participant. The message may inform the participant that a collaboration event he is scheduled to participate in has begun 602 and that the framework was unable to contact him using his preferred contact method. The framework may further give the participant a list of access methods 604 from which to choose to be connected to the collaboration event. For example, for web or video conferences, that participant may be able to choose to be joined to the collaboration event from the computer he is currently logged into, regardless of where that is. For a phone conference, the participant may be given the option to be called at his office phone or cell phone, which has been previously specified in his contact preferences. The participant may further be given the option to specify a new number to use. For example, if the participant is working in a guest office, he may specify the phone number of the guest office, and the framework will call him at that phone number.

Additionally, the participant may be given the option to notify the event coordinator of his status. For example, he may be able to notify the coordinator that he is running late, and will join the event later. Another option would be to notify the coordinator that he will not be able to attend at all. The list of access methods 604 presented is exemplary and not intended to be exhaustive. Any other access methods that may be used for collaboration events may also be included. Furthermore, access methods that are not available for a particular event may not be presented to the participant. For example, if an event is specified to be a phone conference only, a participant may not be given the opportunity to select to join via a web conference or video conference.

Although exemplary instant message interface 600 has been described in relation to a participant who was unable to be joined to an event, it is not intended to be limited to that situation only. A similar interface may be used as to notify participants of upcoming events and to give the participants the opportunity to modify the contact preferences based on the current situation of the participant.

FIG. 7 depicts an exemplary collaboration resource dashboard. Embodiments of the present disclosure advantageously provide a central repository for resource requirements for collaboration events across the entire organization for all time periods. By storing the resource requirement information centrally, system administrators may be able to analyze resource requirements to determine when and where additional collaboration resources may be required. Furthermore, system administrators may be able to request rescheduling of resource intensive collaboration events if sufficient resources are unavailable.

An exemplary collaboration resource dashboard 700 may be displayed to a system administrator. In some embodiments, the resources may be displayed in a well known calendar format, allowing the system administrator to focus on specific dates or times. For example, collaboration resource dashboard 700 depicts the collaboration resource requirements for a single day, Jan. 1, 2009. In this example, the system administrator can review the resource requirements for phone conference bridge ports 702, web conference bandwidth requirements 704 and video conference bandwidth requirements 706. The resource requirements can be displayed for all time periods 708 throughout the day. By utilizing the collaboration resource dashboard, the system administrator can determine if there are sufficient resources available to meet the needs of all scheduled collaboration events.

Because the collaboration resource dashboard is able to access events that are scheduled in the future, the system administrator can develop mitigation plans to alleviate situations where insufficient resources are available. In some situations, this may involve adding new resources. For example, as depicted in FIG. 7, at 2:00 PM 50 phone bridge ports will be required for collaboration events. If insufficient ports are available, the system administrator may mitigate this by purchasing additional ports from the telecommunications service provider on a temporary basis. If insufficient bandwidth is available for either web or video conferencing, the system administrator may attempt to obtain additional bandwidth by purchasing more bandwidth from the service provider, or adding additional hardware to the organizations network. In any case, the system administrator is able to determine resource requirements prior to the scheduled collaboration events, and is given an opportunity to mitigate any situations in which insufficient resources are available. This advantageously allows a system administrator to eliminate resource outages prior to the scheduled time of the collaboration event. In a worst case scenario where insufficient resources are available and no additional resources are available to add, the system administrator may need to mitigate the resource outage by requesting rescheduling of collaboration events.

FIG. 8 depicts a targeted view of a collaboration resource dashboard. Collaboration resources dashboard 800 may provide any number of views to a system administrator. For example, the view as depicted in dashboard 800 depicts the collaboration resource requirements for a single hour on a specific day. One exemplary view may allow a system administrator to see all the collaboration events scheduled for that specific time on that specific day 802. In addition, the system administrator may be able to view all of the individual resources each collaboration event requires. In this example, each collaboration event 802 is associated with phone bridge port requirements 804, web conference bandwidth requirements 806, and video conference bandwidth requirements 808. If it becomes necessary to reschedule collaboration events due to insufficient resources, the system administrator can be presented with usage requirements such that the smallest number of collaboration events must be impacted.

For example, assume that an organization has only 100 Mbps of bandwidth available for video conferencing. By looking at the collaboration resource dashboard as presented in FIG. 7, a system administrator may determine that on Jan. 1, 2009 at 2:00 PM there is a demand for 200 Mbps of bandwidth for video conferencing. If attempts to add additional video conferencing bandwidth either fail or are not possible, the system administrator may need to mitigate the resource outage by rescheduling one or more collaboration events. The system administrator may then drill down to a more focused view of the hour in which insufficient resources are available, as depicted in FIG. 8.

By looking at the collaboration resource dashboard view 800, the system administrator can see the individual collaboration events that are scheduled and the resource requirements of each. In this example, there are three collaboration events 802 scheduled. In the present example, the organization is limited to 100 Mbps of video conferencing bandwidth. By reviewing dashboard 800, the system administrator can determine that canceling or rescheduling Event 3 will have no impact on the available video conferencing bandwidth, because Event 3 is not using video conferencing. The system administrator may be able to see that each of Events 1 and 2 require the full 100 Mbps of available video conferencing bandwidth, and thus it is not possible for both events to occur at the same time. The system administrator may then decide it is necessary to request rescheduling of one of the events.

In some embodiments, the system administrator can be a human operator reviewing bandwidth requirements and making decisions based on those requirements. In other embodiments, the system administration function can be fully automated. In either case the system administrator can make decisions regarding rescheduling of collaboration events based on rules stored in the collaboration rules and policies database as described above. One exemplary rule may be that if an event must be canceled, the event with the least senior participants should be canceled. In terms of the above example, if Event 1 is an event in which the CEO and the entire Board of Directors are participants and Event 2 is an event involving lower level employees, the rule may instruct the system administrator to cancel event 2. Because the collaboration framework is able to access human resource systems, the system administrator will be able to determine the relative positions of each event participant.

Another exemplary rule may be that the event with the least impact to customer relations should be the event to be canceled. For example, if the participants in Event 1 are all working on a customer team that services a one million dollar a year customer and the participants of Event 2 are all working on a customer team that services a one hundred million dollar a year client, then Event 2 should be given priority and Event 1 canceled. Because the collaboration framework has access to customer relationship management systems, the system administrator will be able to make decisions based on the customer impact of cancellation of collaboration events.

Yet another example of a rule may be that the event with participants working on lower priority projects should be canceled. As with the other examples, the collaboration framework may have access to project management systems and the system administrator will be able to make decisions based on project priority.

Although several examples of collaboration rules and policies have been presented, the types of rules and policies are not intended to be exhaustive. Any rule or policies desired by the organization may be set in the collaboration rules and policies database. Because the collaboration framework may be able to access various other systems within the organization, rules can be devised based on any policy the organization deems appropriate. Furthermore, the rules are not required to be based on information from any single source and can be combinations of various sources. For example, information from all sources can be combined to form complex rules and policies.

Figure 9:
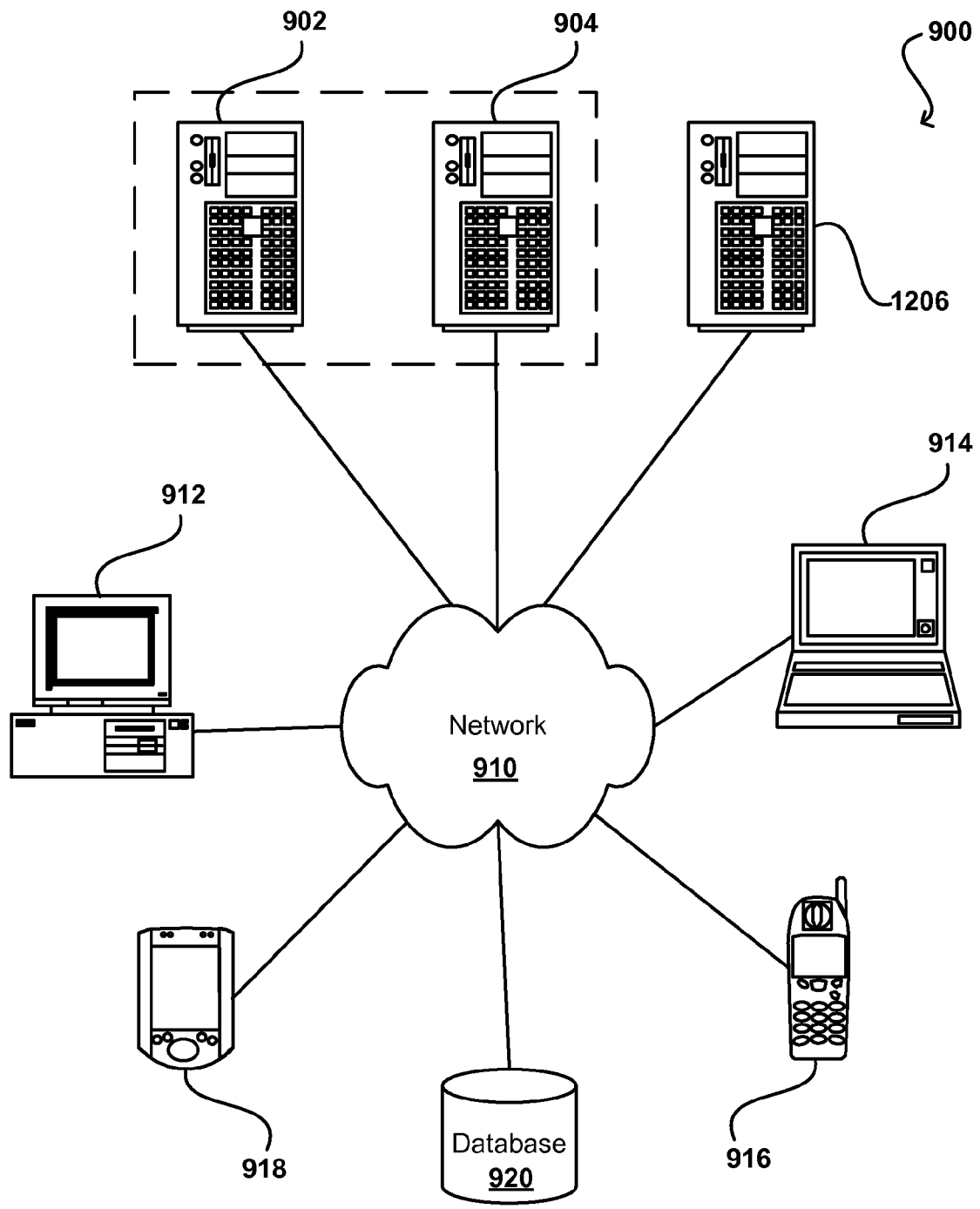
FIG. 9 is a block diagram illustrating components of an exemplary operating environment in which various embodiments may be implemented.

FIG. 9 is a block diagram illustrating components of an exemplary operating environment in which various embodiments may be implemented. The system 900 can include one or more user computers, computing devices, or processing devices 912, 914, 916, 918, which can be used to operate a client, such as a dedicated application, web browser, etc. The user computers 912, 914, 916, 918 can be general purpose personal computers (including, merely by way of example, personal computers and/or laptop computers running a standard operating system), cell phones or PDAs (running mobile software and being Internet, e-mail, SMS, Blackberry, or other communication protocol enabled), and/or workstation computers running any of a variety of commercially-available UNIX or UNIX-like operating systems (including without limitation, the variety of GNU/Linux operating systems). These user computers 912, 914, 916, 918 may also have any of a variety of applications, including one or more development systems, database client and/or server applications, and Web browser applications. Alternatively, the user computers 912, 914, 916, 918 may be any other electronic device, such as a thin-client computer, Internet-enabled gaming system, and/or personal messaging device, capable of communicating via a network (e.g., the network 910 described below) and/or displaying and navigating Web pages or other types of electronic documents. Although the exemplary system 900 is shown with four user computers, any number of user computers may be supported.

In most embodiments, the system 900 includes some type of network 910. The network may be any type of network familiar to those skilled in the art that can support data communications using any of a variety of commercially-available protocols, including without limitation TCP/IP, SNA, IPX, AppleTalk, and the like. Merely by way of example, the network 910 can be a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.11 suite of protocols, GRPS, GSM, UMTS, EDGE, 2G, 2.5G, 3G, 4G, Wimax, WiFi, CDMA 2000, WCDMA, the Bluetooth protocol known in the art, and/or any other wireless protocol); and/or any combination of these and/or other networks.

The system may also include one or more server computers 902, 904, 906 which can be general purpose computers, specialized server computers (including, merely by way of example, PC servers, UNIX servers, mid-range servers, mainframe computers rack-mounted servers, etc.), server farms, server clusters, or any other appropriate arrangement and/or combination. One or more of the servers (e.g., 906) may be dedicated to running applications, such as a business application, a Web server, application server, etc. Such servers may be used to process requests from user computers 912, 914, 916, 918. The applications can also include any number of applications for controlling access to resources of the servers 902, 904, 906.

The Web server can be running an operating system including any of those discussed above, as well as any commercially-available server operating systems. The Web server can also run any of a variety of server applications and/or mid-tier applications, including HTTP servers, FTP servers, CGI servers, database servers, Java servers, business applications, and the like. The server(s) also may be one or more computers which can be capable of executing programs or scripts in response to the user computers 912, 914, 916, 918. As one example, a server may execute one or more Web applications. The Web application may be implemented as one or more scripts or programs written in any programming language, such as Java®, C, C# or C++, and/or any scripting language, such as Perl, Python, or TCL, as well as combinations of any programming/scripting languages. The server(s) may also include database servers, including without limitation those commercially available from Oracle®, Microsoft®, Sybase®, IBM® and the like, which can process requests from database clients running on a user computer 912, 914, 916, 918.

The system 900 may also include one or more databases 920. The database(s) 920 may reside in a variety of locations. By way of example, a database 920 may reside on a storage medium local to (and/or resident in) one or more of the computers 902, 904, 906, 912, 914, 916, 918. Alternatively, it may be remote from any or all of the computers 902, 904, 906, 912, 914, 916, 918, and/or in communication (e.g., via the network 910) with one or more of these. In a particular set of embodiments, the database 920 may reside in a storage-area network ("SAN") familiar to those skilled in the art. Similarly, any necessary files for performing the functions attributed to the computers 902, 904, 906, 912, 914, 916, 918 may be stored locally on the respective computer and/or remotely, as appropriate. In one set of embodiments, the database 920 may be a relational database, such as Oracle 10 g, that is adapted to store, update, and retrieve data in response to SQL-formatted commands.

Figure 10:
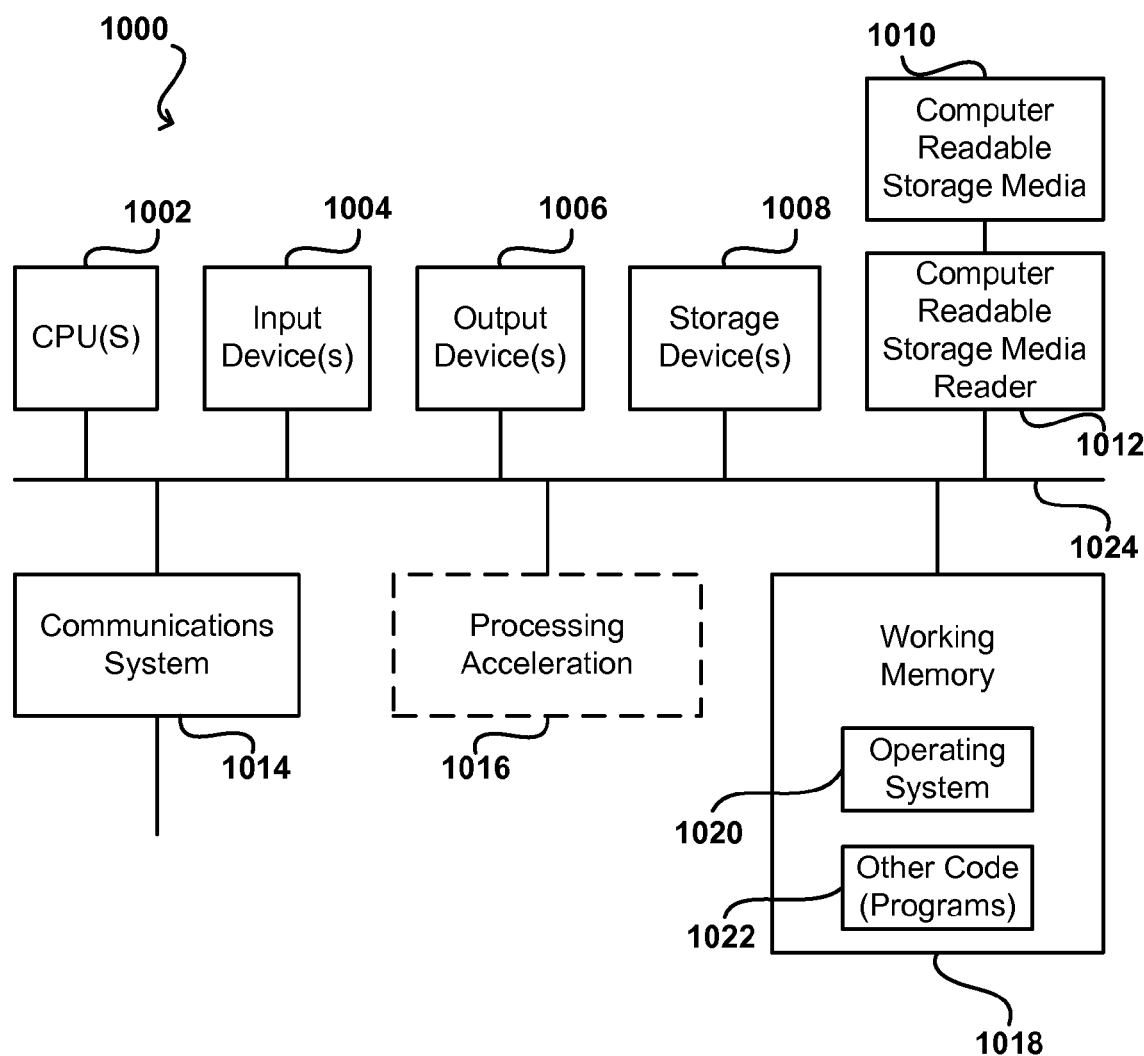
FIG. 10 illustrates an exemplary computer system in which various embodiments may be implemented.

FIG. 10 illustrates an exemplary computer system 1000, in which various embodiments may be implemented. The system 1000 may be used to implement any of the computer systems described above. The computer system 1000 is shown comprising hardware elements that may be electrically coupled via a bus 1024. The hardware elements may include one or more central processing units (CPUs) 1002, one or more input devices 1004 (e.g., a mouse, a keyboard, etc.), and one or more output devices 1006 (e.g., a display device, a printer, etc.). The computer system 1000 may also include one or more storage devices 1008. By way of example, the storage device(s) 1008 can include devices such as disk drives, optical storage devices, solid-state storage device such as a random access memory ("RAM") and/or a read-only memory ("ROM"), which can be programmable, flash-updateable and/or the like.

The computer system 1000 may additionally include a computer-readable storage media reader 1012, a communications system 1014 (e.g., a modem, a network card (wireless or wired), an infra-red communication device, etc.), and working memory 1018, which may include RAM and ROM devices as described above. In some embodiments, the computer system 1000 may also include a processing acceleration unit 1016, which can include a digital signal processor DSP, a special-purpose processor, and/or the like.

The computer-readable storage media reader 1012 can further be connected to a computer-readable storage medium 1010, together (and, optionally, in combination with storage device(s) 1008) comprehensively representing remote, local, fixed, and/or removable storage devices plus storage media for temporarily and/or more permanently containing, storing, transmitting, and retrieving computer-readable information.

The communications system 1014 may permit data to be exchanged with the network and/or any other computer described above with respect to the system 1000.

The computer system 1000 may also comprise software elements, shown as being currently located within a working memory 1018, including an operating system 1020 and/or other code 1022, such as an application program (which may be a client application, Web browser, mid-tier application, RDBMS, etc.). It should be appreciated that alternate embodiments of a computer system 1000 may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, data signals, data transmissions, or any other medium which can be used to store or transmit the desired information and which can be accessed by the computer. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer implemented method of using a collaboration services platform to automatically schedule and invoke a collaboration event, comprising:

receiving a request from a collaboration event coordinator for a collaboration event, the request containing information including a date and time for the collaboration event, a list of participants of the collaboration event, and at least one access resource type to be used for the collaboration event;

storing the information contained in the request for the collaboration event in a scheduled collaboration events database;

determining each participant's access resource type preferences for being joined to the collaboration event;

providing an interface to the scheduled collaboration events database, the interface allowing a system administrator to view all access resource type requirements for all stored collaboration events for any period of time;

analyzing the access resource type requirements of all stored collaboration events to determine if sufficient access resources are available for all stored collaboration events;

prioritizing collaboration events when insufficient access resources are available for all collaboration events, wherein the collaboration events are prioritized based on the participants of each collaboration event;

attempting to initiate contact with each participant, using each participant's access resource type preferences, at the scheduled date and time of the collaboration event;

populating connection information for each participant which is required to access the collaborative event, such that each participant is configured to access the collaboration event using an access resource which is different from the access resource initially used to respond to the request; and granting each contacted participant access to the collaboration event in response to receiving from each contacted participant an identifier that verifies the participant's identity, the identifier being associated with the participant and not the scheduled collaboration event.

2. The computer implemented method of claim 1 wherein the collaboration events are prioritized based on a subject matter of the collaboration event.

3. The computer implemented method of claim 1 wherein the collaboration events are prioritized based on an expected return on investment of the collaboration event.

4. The computer implemented method of claim 1 further comprising the system administrator notifying the collaboration event coordinator when insufficient access resources are available for the collaboration event, the notification instructing the collaboration event coordinator to reschedule the collaboration event.

5. The computer implemented method of claim 1 further comprising the system administrator notifying the collaboration event coordinator when insufficient access resources are available for the collaboration event, the notification instructing the collaboration event coordinator to select a different access resource type to be used for the collaboration event.

6. The computer implemented method of claim 1 further comprising adding access resources when insufficient access resources are available for all collaboration events.

7. The computer implemented method of claim 1 further comprising providing the collaboration event coordinator an interface to display which participants have joined the collaboration event.

8. The computer implemented method of claim 7 wherein the interface further displays which participants are in the process of being joined to the collaboration event.

9. The computer implemented method of claim 8 wherein the interface further displays which participants were unable to be joined to the collaboration event.

10. The computer implemented method of claim 1 further comprising storing a preference ordered list of the access resource type preferences of each participant in a participant preferences database.

11. The computer implemented method of claim 10 wherein attempting to initiate contact with each participant includes iteratively attempting to contact each participant using the preference ordered list, wherein if the participant is unable to join the collaboration event using a given access preference, the next preference in the preference ordered list is used to initiate contact.

12. The computer implemented method of claim 10 wherein the access resource type preferences include a landline phone, a cellular phone, a VoIP phone, a computer workstation, a laptop, and a network location.

13. The computer implemented method of claim 1 wherein the participant access resource preference indicates a workstation the participant is currently logged into.

14. The computer implemented method of claim 1 wherein the collaboration event includes a telephone conference, a video conference, a web conference, an instant message, and an e-mail.

15. A computer readable memory device storing a set of instructions which, when executed by a processor, causes the processor to automatically schedule and invoke a collaboration event by:
- receiving a request from a collaboration event coordinator for a collaboration event, the request containing information including a date and time for the collaboration event, a list of participants of the collaboration event, and at least one access resource type to be used for the collaboration event;
- storing the information contained in the request for the collaboration event in a scheduled collaboration events database;
- determining each participant's access resource type preferences for being joined to the collaboration event;
- providing an interface to the scheduled collaboration events database, the interface allowing a system administrator to view all access resource type requirements for all stored collaboration events for any period of time;
- analyzing the access resource type requirements of all stored collaboration events to determine if sufficient access resources are available for all stored collaboration events;
- prioritizing collaboration events when insufficient access resources are available for all collaboration events, wherein the collaboration events are prioritized based on the participants of each collaboration event;
- attempting to initiate contact with each participant, using each participant's access resource type preferences, at the scheduled date and time of the collaboration event;
- populating connection information for each participant which is required to access the collaborative event, such that each participant is configured to access the collaboration event using an access resource which is different from the access resource initially used to respond to the request; and
- granting each contacted participant access to the collaboration event in response to receiving from each contacted participant an identifier that verifies the participant's identity, the identifier being associated with the participant and not the scheduled collaboration event.

16. A system for automatically scheduling and invoking a collaboration event comprising, the system including a processor operable to execute instructions and a data storage medium for storing the instructions which, when executed by the processor, cause the processor to:
- receive a request from a collaboration event coordinator for a collaboration event, the request containing information including a date and time for the collaboration event, a list of participants of the collaboration event, and at least one access resource type to be used for the collaboration event;
- store the information contained in the request for the collaboration event in a scheduled collaboration events database;
- determine each participant's access resource type preferences for being joined to the collaboration event;
- provide an interface to the scheduled collaboration events database, the interface allowing a system administrator to view all access resource type requirements for all stored collaboration events for any period of time;
- analyze the access resource type requirements of all stored collaboration events to determine if sufficient access resources are available for all stored collaboration events;
- prioritize collaboration events when insufficient access resources are available for all collaboration events, wherein the collaboration events are prioritized based on the participants of each collaboration event;
- attempt to initiate contact with each participant, using each participant's access resource type preferences, at the scheduled date and time of the collaboration event;
- populate connection information for each participant which is required to access the collaborative event, such that each participant is configured to access the collaboration event using an access resource which is different from the access resource initially used to respond to the request; and
- grant each contacted participant access to the collaboration event in response to receiving from each contacted participant an identifier that verifies the participant's identity, the identifier being associated with the participant and not the scheduled collaboration event.

* * * * *

UNITED STATES PATENT AND TRADEMARK OFFICE
CERTIFICATE OF CORRECTION

PATENT NO. : 8,463,632 B2
APPLICATION NO. : 12/269225
DATED : June 11, 2013
INVENTOR(S) : Niazi Page 1 of 1

It is certified that error appears in the above-identified patent and that said Letters Patent is hereby corrected as shown below:

In the Specification:

Column 5, line 65, delete "that that" and insert -- that --, therefor.

Column 6, line 2, delete "from" and insert -- from. --, therefor.

Signed and Sealed this
Eighth Day of October, 2013

Teresa Stanek Rea
*Deputy Director of the United States Patent and Trademark Office*